(12) United States Patent
Kuo

(10) Patent No.: US 9,117,004 B2
(45) Date of Patent: Aug. 25, 2015

(54) METHOD AND APPARATUS FOR PROVIDING USER INTERFACE

(71) Applicant: Jenke Wu Kuo, San Diego, CA (US)

(72) Inventor: Jenke Wu Kuo, San Diego, CA (US)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 13/645,392

(22) Filed: Oct. 4, 2012

(65) Prior Publication Data
US 2014/0101573 A1 Apr. 10, 2014

(51) Int. Cl.
*G06F 17/30* (2006.01)
*G06F 3/048* (2013.01)
*G06F 9/44* (2006.01)
*G06F 3/01* (2006.01)

(52) U.S. Cl.
CPC .......... *G06F 17/30905* (2013.01); *G06F 3/048* (2013.01); *G06F 8/38* (2013.01); *G06F 3/01* (2013.01)

(58) Field of Classification Search
CPC .................................. G06F 3/01; G06F 3/048
USPC ........................................................ 715/760
See application file for complete search history.

(56) References Cited

U.S. PATENT DOCUMENTS

| | | | |
|---|---|---|---|
| 2004/0128342 A1* | 7/2004 | Maes et al. | 709/200 |
| 2011/0252334 A1* | 10/2011 | Verma et al. | 715/744 |
| 2012/0011282 A1* | 1/2012 | Williams et al. | 709/246 |
| 2012/0036494 A1 | 2/2012 | Gurumohan et al. | |

OTHER PUBLICATIONS

Mutli-Platform Frameworks Destroy Android UX; Android UI Patterns; Mar. 29, 2012; 28 pages; http://www.androiduipatterns.com/2012/03/multi-platform-frameworks-destroy.html.

* cited by examiner

*Primary Examiner* — Andrea Leggett
(74) *Attorney, Agent, or Firm* — Fitch, Even, Tabin & Flannery LLP

(57) ABSTRACT

A computer implemented method for presenting a user-interface on a device, the method includes the steps of loading an user interface on the device, the user interface having at least one media element, reading a media element including a plurality of object elements, selecting at least one object element within the media element based on a platform information of the device, and presenting a media content of the media element using a parameter set in the at least one object element.

18 Claims, 3 Drawing Sheets

METHOD AND APPARATUS FOR PROVIDING USER INTERFACE

BACKGROUND OF THE INVENTION

1. Field of the Invention

The present invention relates generally to computer user interfaces, and more specifically to providing user interfaces on multiple platforms.

2. Discussion of the Related Art

User interfaces are generally designed to facilitate the interaction between human and machine, to allow for operation and control of the machine, and to provide and feedback from the machine which aids the operator in making operational decisions. The design of computer user interface is an important component of many computer applications, and can affect a user's overall experience with an application.

SUMMARY OF THE INVENTION

In one embodiment, the invention can be characterized as a computer implemented method for presenting a user-interface on a device. The method includes the steps of loading an user interface on the device, the user interface having at least one media element, reading a media element including a plurality of object elements, selecting at least one object element within the media element based on a platform information of the device, and presenting a media content of the media element using a parameter set in the at least one object element.

In another embodiment, the invention can be characterized as a storage medium storing a program. The program adapted to cause a processor-based device to execute steps including load an user interface on the device, the user interface having at least one media element, read a media element including a plurality of object elements, select at least one object element within the media element based on a platform information of the device, and present a media content of the media element using a parameter set in the at least one object element.

In a further embodiment, the invention may be characterized as a computer-implemented method for providing a user-interface. The method including the steps of constructing a user interface having one or more media elements, defining a plurality of object elements for at least one of the one or more media elements, each object element being associated with a platform class, and assigning a set of media element parameters to each of the plurality of object elements.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
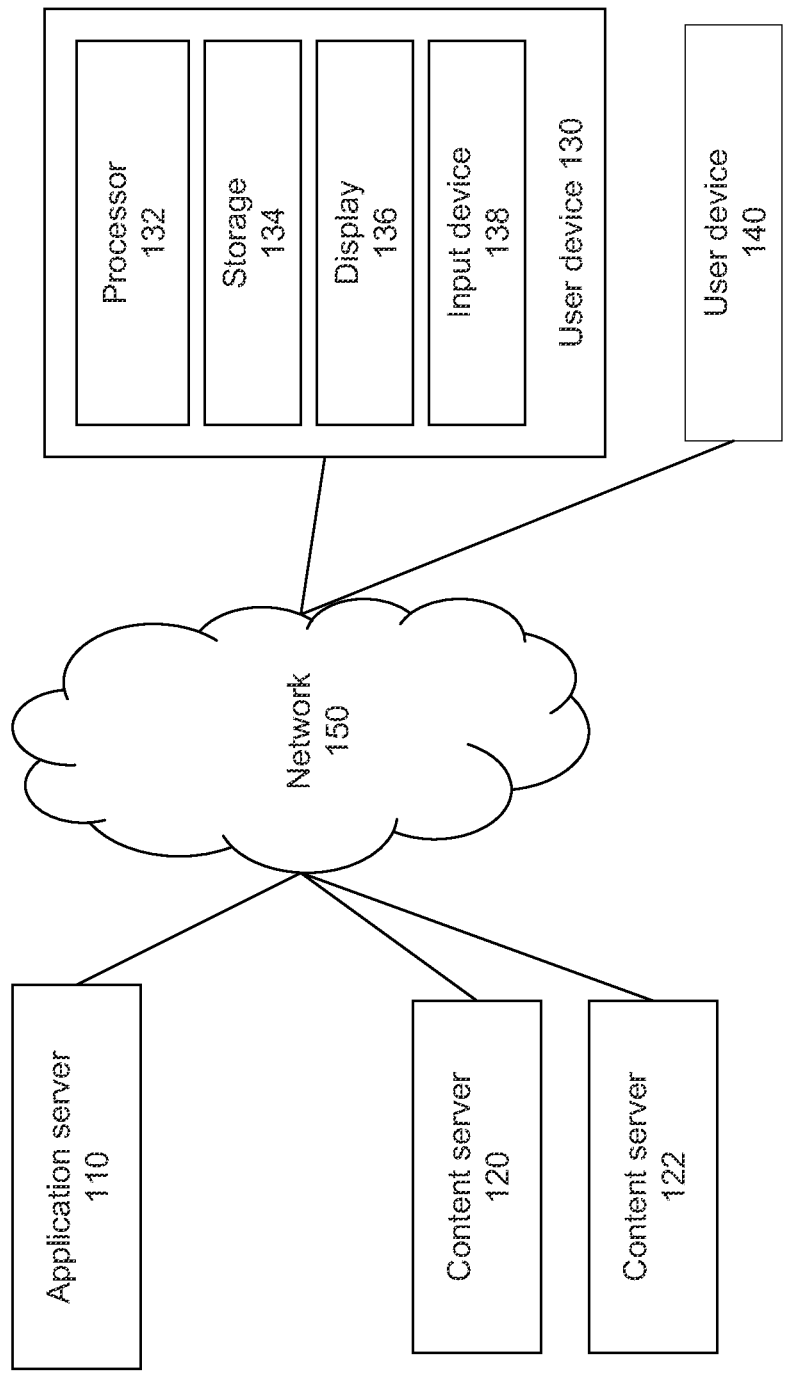
FIG. 1 is a simplified block diagram of a system according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

HTML5 has been developed as a web mark-up language for displaying web pages. Several new syntactical features have been added in HTML5, including <video>, <audio>, and <canvas> elements. These elements were developed to reduce the dependency and overhead of plug-in that is commonly used in earlier versions of HTML. However, the definable parameters in these media elements alone are often not sufficient to provide support for platform specific user interface designs. As a result, a user interface written for and tested on some platforms may appear very differently or entirely fail to function on other platforms. This may be caused by hardware differences and/or software support differences of the operating system or web browser of the device. In order to accommodate the platform differences, separate websites or user interfaces are often designed for different platforms. In some implementations, the server would redirect the device to different interfaces or web pages depending on the platform information the server receives from the device.

Referring first to FIG. 1, a system for providing user interface to multiple platforms according to some embodiments is shown. The system includes an application server 110, content servers 120 and 122, and user devices 130 and 140 in communication through a network 150. The user device 100 further includes a processor 132, a storage medium 134, a display 136, and an input device 138. While several components of a system are shown, it is understood that not all components are necessary in all embodiments.

In some embodiments, the application server 110 hosts an application. Application may refer to a downloadable application, a cloud-based application, a web-based application, a local and cloud hybrid application, and/or a webpage. In some embodiments, one of user devices 130 and 140 downloads an application from the application server 110. In some embodiments, one of user devices 130 and 140 accesses a website or web-based application stored on the application server 110 through a browser or other means of accessing the network 150. In some embodiments, the application provides a remote user interface (RUI), which allows the user to communicate with the application. In some embodiments, a user device may obtain an application or a user interface from another user device or another server.

The user interface of the application may include one or more media elements. Media elements can include video, audio, canvas, vector animation elements etc. In some embodiments, a media element may be interactive. In some embodiments, the media element includes media content that is stored on one or more content servers 120 and 122. For example, media content may be video, audio, animation, image, in either streaming or non-streaming form. When the user device 130 runs an application from the application server 110 or accesses an application on the application server 110 through a RUI, the media elements in the application may retrieve the media content from the content server 120 and present it on the user device 130.

While the content servers 120 and 122 are shown as being separate from application server 110, in some embodiments, the application server 110 and one or both of the content servers 120 and 122 can be implemented on the same physical device, and/or share the same physical storage. In some embodiments, the content of the media element may be provided either by the application server 110 or from a local storage medium 134 of the user device 130.

The network 150 may be the internet, or a regional, local, private, and/or restricted network.

The user devices 130 and 140 may be a desktop computer, a laptop computer, a smart phone such as an android based phone or iPhone, a tablet computer, a television, a game console, a television set-top box, or any processor-based device. In some embodiments, the user device 130 may include a web browser application.

The processor 132 may be a CPU, and may be adapted to execute an application or RUI received from the application server 110 and/or other applications stored on the storage medium 134. The storage 134 may be a hard drive, RAM, ROM, and/or other non-transitory storage mediums for storing one or more application and/or media content. The display 136 may be a LCD, LED, Plasma, e-ink, OLED or the like. The display may be adapted to display the user interface of an application. The input 38 may include one or more of touch screen, keyboard, mouse, track pad, microphone, camera, motion sensor etc. that is integrated with or separate from the user device 130.

While the user device 130 is shown to include a processor 132, a storage medium 134, a display 136, and an input device 138, in some embodiments, some or all of these elements can be implemented in desperate devices. For example, the storage 134 may be an internal drive, an external drive, a network drive, a cloud storage drive, or a combination of at least two of the above. The display 136 may be integrated, detachable, or the display of another device accessing the user device 130 remotely. The input device 138 may be a touch screen integrated with the display 136. The input device 138 may also be integrated with the device 130 or be a remote device such as a remote control or a wired or wireless keyboard, mouse, or microphone.

In some embodiments, the user device 140 may be a device similar to the user device 130. In some embodiments, the user devices 130 and 140 may be different types of device or may have different screen size, screen resolution, processing capability, input method, network access capability, RAM capacity, operating system, browser, and/or user defined settings. In some embodiments, user devices 130 and 140 may be devices on different types of platforms. Here and throughout the entire application, platform may refer to some or all of a device's hardware and software specifications, depending on implementation. Two devices can be said to be on different platforms if some or all of their select hardware and software specifications are different. Two devices can be said to be in the same platform class if some or all of their select hardware and software specifications are the same or similar.

While the application server 110, the content servers 120 and 122, and user devices 130 and 140 are shown to be individually connected to network 150 in FIG. 1, two of more of these elements can share a connection to the network through a shared connection. For example, the device 130 and 140 may be connected to the network through a shared local area network connection. In some embodiments, the user devices 130 and 140 do not need to be connected to the network once the application is loaded onto the device. While in some embodiment, the user device 130 loads a RUI of an application running the application server 110, and interacts with the application server 110 through the network 150. In some embodiments, the user devices 130 and 140 only communicate with one of the content servers 120 and 122 during the operation of the user interface.

Figure 2:
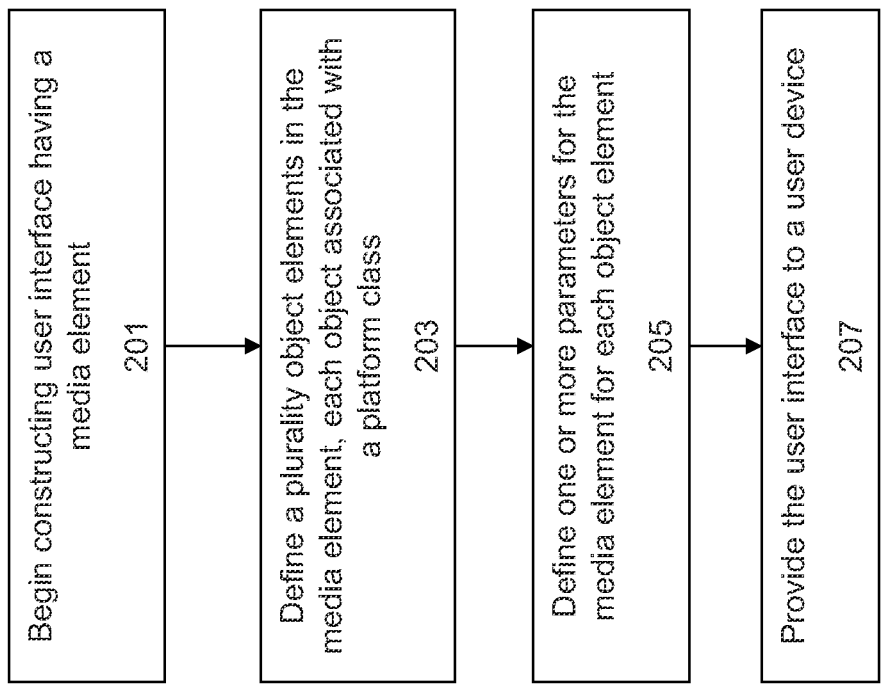
FIG. 2 is a process diagram showing a method for providing a user interface according to some embodiments of the present invention.

Referring next to FIG. 2, a method for providing a user interface is shown. In step 201, a user interface is defined with one or more media elements. The user interface may be part of a downloadable application, a local application, a cloud-based application, a web-based application, a local and cloud hybrid application, a browser accessible application, and/or a webpage. The user interface may be a RUI of an application on the application server. In some embodiments, the user interface is defined using HTML5. In some embodiments, the user interface may be defined in another mark-up or programming language compatible or backward compatible with HTML5 standards. In some embodiments, the interface is defined using a language developed subsequent to HTML5, but include elements that uses similar principles as the media and object elements of HTML5.

A media element may be an audio, video, canvas or other elements of a mark-up language. In HTML5 for example, these elements are defined by using <video>, <audio>, and <canvas> tags. With these tags, the user interface can be designed to display an imbedded video, play an audio file, and/or display a canvas element. In other mark-up or programming languages, a media element may be an element used to define and present media content on a user interface. In some embodiments, the media element may include streaming content, such as streaming video and streaming audio. In some embodiment, the media element may include a playlist of videos and/or audios.

In step 203, two or more object elements are defined for at least one media element in the user interface. An object element is generally used to include an object in the page of the type specified by the type attribute. This may be in any MIME-type the user agent understands, such as an embedded HTML page, a file to be handled by a plug-in such as Flash, a Java applet, a sound file, etc. In HTML5, for example, an object element is defined with the <object> tag. In other languages, other tags with the similar properties may be used to perform similar functions.

In some embodiments, object elements may be defined to be recognized by a class of devices or a platform class. For example, a first object may be defined to run on a platform class that includes Sony Xperia S, Xperia ion, and Xperia P, a second object may be defined to run on a platform class that includes Sony Bravia KDL-46E520, a third object may be defined to run on a platform class that includes that includes iPhone 4 and iPhone 4S etc. In some embodiments, a lookup table is provided with the user interface, associating devices with a platform class. A device may be identified by its model name, model ID, system specification etc. An example of a lookup table according to some embodiments of the present invention is provided below in Table 1.

TABLE 1

Example look-up table 1

| Platform class | Device model |
|---|---|
| 1 | Sony Xperia S, Xperia ion, and Xperia P |
| 2 | Sony Bravia Television all models |
| 3 | iPhone4, iPhone 4S |
| 4 | Sony Tablet S, Kindle, Nook |
| 5 | Sony PS3, Xbox 360 |
| 6 | All others |

The above table is provided as an example only. Any number of classes can be defined in the look-up table, and any number of devices and device models can be defined in each class as well as in the table. In some embodiments, a platform class (platform class 6 in table above) is used as a default ID. A device that is not found on the look-up table may be assigned to the default class. In some embodiments, the media element includes parameters that can be used by a device that does not recognize any of the object elements.

In some embodiments, the user interface uses the hardware and software specifications of the user device running the user interface to determine platform class. Hardware and software specifications may include, but is not limited to: device type, operating system, screen size, screen resolution, processor seed, RAM capacity, input method, network connection mode, connection speed, installed drivers, screen orientation, language setting, regional setting, device service provider, geographical location, GPS location etc. The specification and/or settings of the device may be used as conditions to assign the device into a platform class.

An example of a simplified lookup table according to some embodiments of the present invention is provided below in Table 2.

TABLE 2

Example look-up table 2

| Platform class | Device |
|---|---|
| 1 | Device type: Smartphone<br>Operating system: Android version 3 and above<br>Screen size: between 4-5 inches<br>Processor speed: 1 GHz and above<br>Resolution: 480 × 854 and above<br>Physical keyboard: Not Present<br>Connection mode: 3G |
| 2 | Operating system: Android version 2.9 and below<br>Screen size: between 4-5 inches<br>Processor speed: 1 GHz and above<br>Resolution: 480 × 854 and above<br>Physical keyboard: Present<br>Connection mode: Wi-Fi |
| 3 | Device type: Smartphone<br>Operating system: IOS |

TABLE 2-continued

Example look-up table 2

| Platform class | Device |
|---|---|
| 4 | Device type: Tablet Computer<br>Operating system: Windows 8<br>Resolution: 600 × 810 and above |
| 5 | Device type: laptop computer<br>Operating system: Windows XP<br>Connection mode: T1<br>Screen size: 13.5 inches |
| 6 | Device type: Television<br>Screen size: 50-60 Inches<br>Connection mode: Wi-fi |
| 7 | Device type: game console |
| default | All others |

The above table is provided as an example only. Any number of classes can be defined in the look-up table, and any number and combination of software and hardware specifications and settings can be use to define the classes. The user interface can also use a decision tree to assign a platform class to a device. In some embodiments, device with specifications that do not fall under any of the defined classes may be assigned to a default class. In some embodiments, the classes may be defined only by one specification condition. For example, in some embodiments, the platform class may be assigned solely based on the screen size of the device or the operating system of the device. In some embodiments, user selected setting can be used to determine platform class. In some embodiments, the user has the option to directly select a platform class with which to run a user interface or view a website.

In some embodiments, the lookup table is a based on a combination of device model and specifications. For example, some platform classes may be assigned based on device model as shown in table 1, and the remaining devices are assigned to platform classes based on their hardware and/or software specification and capability as shown in table 2.

In some embodiments, some of the object elements may be defined for one specific device. For example, a first object may be defined to run on Sony Xperia S, a second object may be defined to run on a Sony Bravia KDL-46E520 television, a third object may be defined to run on an iPhone 4, etc.

In some embodiments, a lookup table is provided as part of, or along with, the user interface or the application. In some embodiment, the lookup table is stored locally on the device. That is, once the application is loaded onto the device, the device can independently determine platform class and select parameters of a media element without communicating with a remote server or another device. The application server and content server do not need to know hardware or software information relating to the user device. The application server can simply provide the same user interface indiscriminately to all devices. Even for cloud and web-based applications, in some embodiments, the application server can interact with devices on multiple platforms with the same application.

In step 205, one or more parameters for the media element are assigned to each object element. Media elements in markup languages such as HTML5 have pre-defined parameters that can be use to affect how the media element appears and functions. Object elements can also insert parameters that are not pre-defined for the specific media element to affect the presentation and functions of a media element.

The video element in HTML5, for example has the following method, property, and event parameters or contributes.

TABLE 3

HTML5 Video element parameters

| Methods | Properties | Events |
| --- | --- | --- |
| play( ) | currentSrc | play |
| pause( ) | currentTime | pause |
| load( ) | videoWidth | progress |
| canPlayType | videoHeight | error |
| | duration | timeupdate |
| | ended | ended |
| | error | abort |
| | paused | empty |
| | muted | emptied |
| | seeking | waiting |
| | volume | loadedmetadata |
| | height | |
| | width | |

The table 3 is provided as an example only. Additional parameters and parameters associated with other media elements in HTML5 and other mark-up or programming languages may also be used in the method shown in FIG. 2.

In some embodiments, one or more parameters are defined in each object element associated with each platform class. In HTML5, for example, a video element having multiple object elements may have the following structure:

```
<video>
...
<object classid="1">
<param name="platform1" value="1">
<param name="platform2" value="2">
<param name="default" value="0">
...
</object>
<object classid="2">
...
</object>
<object classid="3">
...
</object>
...
</video>
```

The above sample code is provided for illustration only. The same principle can be applied to other media elements, with other parameters, and in another mark-up or programming languages.

In some embodiments, one platform class may be associated with more than one object element, and an object element may be defined to be run on more than one platform class.

In some embodiments, the parameters of a media element are defined on a parameter by parameter basis. That is, each parameter may have its own lookup table and its own set of platform class association.

The parameters may be defined according to how the programmer intends for the user interface to be presented on different user devices. For example, the programmer may define the height and width of a canvas element to be 300×400 pixels for a platform class including some smart phones, and 600×800 pixels for a platform class including tablet computers or higher resolution smartphones. In some embodiments, the method shown in FIG. 2 allows the programmer to provide a substantially similar user interface experience across multiple platforms without the need of creating separate applications for different classes of platforms.

The parameters can also be defined to provide a customized interface for different devices. For example, different controls can be provided for devices using touch screen, keyboard, mouse, TV remote control, game controller, voice recognition control, etc. The content of the media element can also be presented using different video and/or audio source depending on the device's connection mode, connection speed, audio driver, video driver, screen size, screen resolution, geographical location etc.

In some embodiments, the object element may include further elements, or include content not associated with parameters of the media element. In some embodiments, the object elements may include system plug-in code for dedicated platform to support unique features. For example, the object element may include parameters related to a flash player plug-in or Java plug-in.

In some embodiments, the media element may also include other elements in additional to the object elements.

In step 207, the constructed user interface is provided to a user device. The user interface may be provided as part of a downloaded application that runs off the user device. The user interface may be a website accessed through a standard web browser such as Internet Explorer, Fire Fox, or Chrome. The user interface may also be accessed using a dedicated user end program. The user interface may be provided as part of a cloud-based or web-based application accessed through a web browser or another application. The user interface may also be a RUI of an application on the application server or another user device. The user interface can be transferred to the user device through any known data transfer means, such as through the internet, through a computer readable storage medium, and through a local and/or one-to-one connection.

Figure 3:
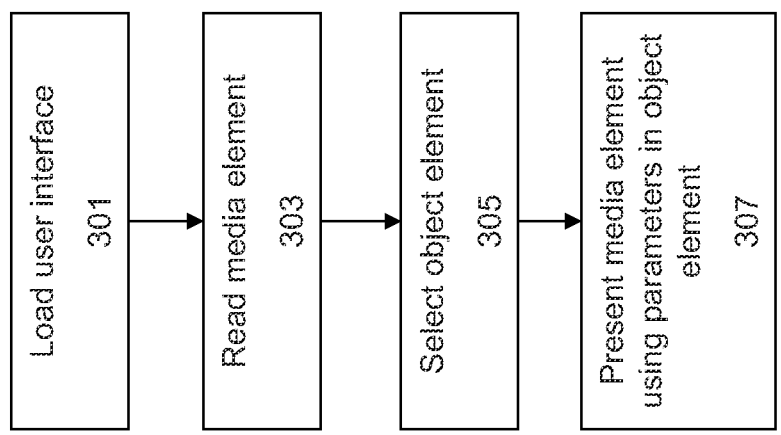
FIG. 3 is a process diagram showing a method for presenting a user interface according to some embodiments of the present invention.

Referring next to FIG. 3, a method for presenting a user interface on a user device is shown. The user device may be any processor-based device such as a smartphone, a computer, a tablet computer, a smart television, a game console, television set-top box, etc.

At step 301, a user interface is loaded on the user device. In some embodiments, the user interface may be loaded onto a hard-drive storage or on the RAM of the user device. An application may be entirely or partially received from a remote source such as through a network or retrieved from a local storage. In some embodiments, the loading of the user interface comprises accessing a website using a web browser. In some embodiments, the loading of the user interface comprises opening an application stored either locally or remotely. In some embodiments, the loading of the user interface comprises opening a RUI associated with an application on an application server. In some embodiments, the loading of the user interface includes storing a lookup table corresponding device platforms with platform classes such as the ones described with reference to step 203 of FIG. 2.

At step 303, the user interface causes the device to read a media element. In some embodiments, a media element may be a video, audio, or canvas element of a HTML5 compatible language. In some embodiments, a media element is an element used to present a video, audio, image, and/or vector image and animation element to a user. The term "read" may refer to initiating the media element and/or interpreting the code of the user interface in preparation of rendering the user interface.

At step 305, the user interface program causes the device to select an object element inside the media element using the device's platform information. The user interface may also retrieve or determine the user device's platform information during this step. In some embodiments, the user interface determines the platform information by retrieving the device model information of the user device running the application. In some embodiments, the user interface determines the platform information by retrieving hardware and/or software information and specifications of the user device. In some embodiments, the user interface determines the platform information based at least partially on user setting. The platform information may be used to determine a platform class. In some embodiment, a platform class is determined by using a lookup table such as the ones described with reference to step 203 of FIG. 2. And the platform class is then used to cause the user interface to run at least one of the object elements within the media element.

In some embodiments, the device would try to run every object element until it reaches one that is recognized by the device. In some embodiments, if the device is not able to successful use any of the object elements, the devices uses a default parameter set provided in the media element.

In some embodiments, the device may select an object element by ignoring object elements not associated with the platform information of the device. For example, if the device has a platform class of 5, the device will skip over object elements with platform classes 1 through 4 and thus, select the parameter set defined in the object element associated with platform class 5. If there are additional object elements 6-20, for example, the device may skip over those object elements as well.

In some embodiments, more then one object element may be associated with a platform class, and a platform class may cause one or more object elements to be selected.

At step 307, one or more media content of the user interface of step 301 is presented using a parameter set in the object element selected at step 303.

The parameters may be, but is not limited to, one or more of the parameters described with reference to step 205 of FIG. 2.

Presenting the media element may include presenting a media content in the media element according to the parameters in the object element selected in step 305. The media content may be from a streaming or non-streaming source. The media content may also be from a local storage device.

In some embodiments, a media element may be a video, audio, or canvas element of a mark-up language that is compatible with HTML5. In some embodiments, a media element may be an element in a markup or programming language used to present media content in a user interface.

Parameters of a media element can be configured to affect the presentation of a media content defined by the media element. For example, if the parameter set in the object element selected in step 305 defines the height of the canvas element to be 200 pixels and the width to be 400 pixels, than the canvas element is displayed with 200×400 resolution on the device's display. In another example, if the parameter set in the object element selected in step 305 defines the source of the video to be first content server, then the application presents the video element with a video file retrieved from the first content server.

In some embodiments, the parameters can affect how the media is presented, including size, resolution, volume, media source, location, text description, caption, font, text size, etc. In some embodiments, the parameters can affect how a user can interact with the media content, for example, different controls can be provided based on the available input means.

Other media elements having parameters in other mark-up or programming languages may also be used in accordance with the method shown in FIG. 3.

With the methods shown in FIGS. 2 and 3, a user interface developer or programmer can construct a single user interface to be used across multiple platforms, thus reducing or eliminating the need to develop separate applications for different platforms. The use of object elements within media elements also allows user interfaces to be modified according to a platform's capabilities and limitations. In some embodiments, a substantially uniform user interface can be presented on multiple platforms with the same application.

In some embodiments, the same application can provide varied and customized presentation and functions on different platforms. For example, the same application may provide one type of control on a touch screen device, another type of control on a keyboard and mouse device, and yet another type of control on a television operated using a remote control. Generally, the use of object elements in media elements provides a flexibility that can enhance a user's experience in many ways.

The methods described in FIGS. 2 and 3 can be applied in various ways across various platforms. For example, a user may download a TV application on a tablet computer and browse an electronic program guide (EPG) on the tablet. The user may select a channel or a program through the user interface of application displayed on the tablet. The tablet may notify a digital TV to download the same TV application, or directly send the application to the digital TV. The television can then execute the TV application to display the EPG having similar user interface appearance, but with the additional tuning feature native to the digital TV. For example, with the use of object elements in the TV application, selecting a channel or program on the tablet computer may send instructions to the digital TV, while selecting a channel or program on the digital TV may cause the TV to directly tune to that channel or program. Additionally, the object elements may be used to adjust the appearance of the user interface display to adapt to the small screen of the tablet and the large screen of a digital TV. The object elements may also be used to allow the user interface on the digital TV to be controlled through a TV remote control.

Consistency of user interface across multiple platforms provides familiarity to users, and reduces the learning curve and encourages the adaptation and use of the application. The ability to accommodate multiple platforms with a single application also reduces the applications' time to market, and reduce the time and labor required to make any subsequent updates and enhancements to the application. The customizability of the application also allows one single application to be tailored to a desired user experiences for multiple platforms. Additionally, because the application gives user devices the ability to independently determine a suitable parameter set, a platform-specific user interface can be presented without requiring a specialized server and allows the applications to run in off-line mode. That is, once the application is loaded on the user device, the user device is able automatically determine parameters that should be used to present media elements in the application without further communications with the server or other devices. The applications may also be portable between devices. That is, the same application code can be transferred between multiple platforms to provide similar or customized user interface to a variety of different platforms.

While many of the examples in the present description are provided using HTML5 specific language, a person skilled in the art would recognize the same principle can be applied to other mark-up or programming language without departing from the spirit of the present disclosure.

While the invention herein disclosed has been described by means of specific embodiments, examples and applications thereof, numerous modifications and variations could be made thereto by those skilled in the art without departing from the scope of the invention set forth in the claims.

What is claimed is:

1. A computer implemented method for presenting a user-interface comprising:
   loading a user interface on a device, the user interface having at least one media element;
   reading a media element including a plurality of object elements;
   selecting at least one object element within the media element based on a platform information of the device; and
   presenting a media content of the media element using a parameter set in the at least one object element;
   wherein the selecting of the at least one object element comprises skipping over any object element loaded on the device that is not associated with a platform of the device; and
   wherein the plurality of object elements comprises a default parameter set which is selected when the platform information of the device does not match a defined platform information.

2. The method of claim 1, wherein the media element comprises a video, audio, or canvas element.

3. The method of claim 1, wherein the user interface is defined in a HTML5 compatible markup language.

4. The method of claim 1, wherein each of the plurality of object elements corresponds to at least one device platform class.

5. The method of claim 1, wherein the platform information comprises at least one hardware or software specifications of the device.

6. The method of claim 1, wherein the parameter set comprises at least one of width, height, control, or source parameters of the media element.

7. The method of claim 1, wherein the platform information is a platform class determined using a lookup table which associates a plurality of device models with a plurality of platform classes.

8. The method of claim 7, wherein the lookup table is stored on an internal storage of the device.

9. The method of claim 1, wherein the plurality of object elements are configured to cause the user interface to have a substantially uniform appearance on a plurality of devices having different hardware and/or software specifications.

10. A storage medium storing a program, the program adapted to cause a processor-based device to execute steps comprising:
   load a user interface on a device, the user interface having at least one media element;
   read a media element including a plurality of object elements;
   select at least one object element within the media element based on a platform information of the device; and
   present a media content of the media element using a parameter set in the at least one object element;
   wherein select the at least one object element comprises skipping over any object element loaded on the device that is not associated with a platform of the device; and
   wherein the plurality of object elements comprises a default parameter set which is selected when the platform information of the device does not match a defined platform information.

11. The storage medium of claim 10, wherein the media element comprises a video, audio, or canvas element.

12. The storage medium of claim 10, wherein the user interface is defined in a HTML5 compatible markup language.

13. The storage medium of claim 10, wherein each of the plurality of object elements corresponds to at least one device platform class.

14. The storage medium of claim 10, wherein the platform information comprises at least one hardware or software specifications of the device.

15. The storage medium of claim 10, wherein the parameter set comprises at least one of width, height, control, or source parameters of the media element.

16. The storage medium of claim 10, wherein the platform information is a platform class determined using a lookup table which associates a plurality of device models with a plurality of platform classes.

17. The storage medium of claim 16, wherein the lookup table is stored on an internal storage of the device.

18. A computer-implemented method for providing a user-interface, the method comprising:
   constructing a user interface having one or more media elements;
   defining a plurality of object elements for at least one of the one or more media elements, each object element being associated with a platform class; and
   assigning a set of media element parameters to each of the plurality of object elements;
   wherein each of the plurality of object elements is configured to be automatically skipped over by a device not in the associated platform class; and
   wherein the plurality of object elements comprises a default parameter set which is configured to be selected when the platform information of the device does not match a defined platform information.

* * * * *

UNITED STATES PATENT AND TRADEMARK OFFICE
CERTIFICATE OF CORRECTION

| | | |
|---|---|---|
| PATENT NO. | : 9,117,004 B2 | Page 1 of 1 |
| APPLICATION NO. | : 13/645392 | |
| DATED | : August 25, 2015 | |
| INVENTOR(S) | : Kuo | |

It is certified that error appears in the above-identified patent and that said Letters Patent is hereby corrected as shown below:

On the title page, item 56 column 2, OTHER PUBLICATIONS, line 1, delete "Mutli" and insert --Multi--.

Signed and Sealed this
First Day of March, 2016

Michelle K. Lee
*Director of the United States Patent and Trademark Office*